UNITED STATES PATENT OFFICE.

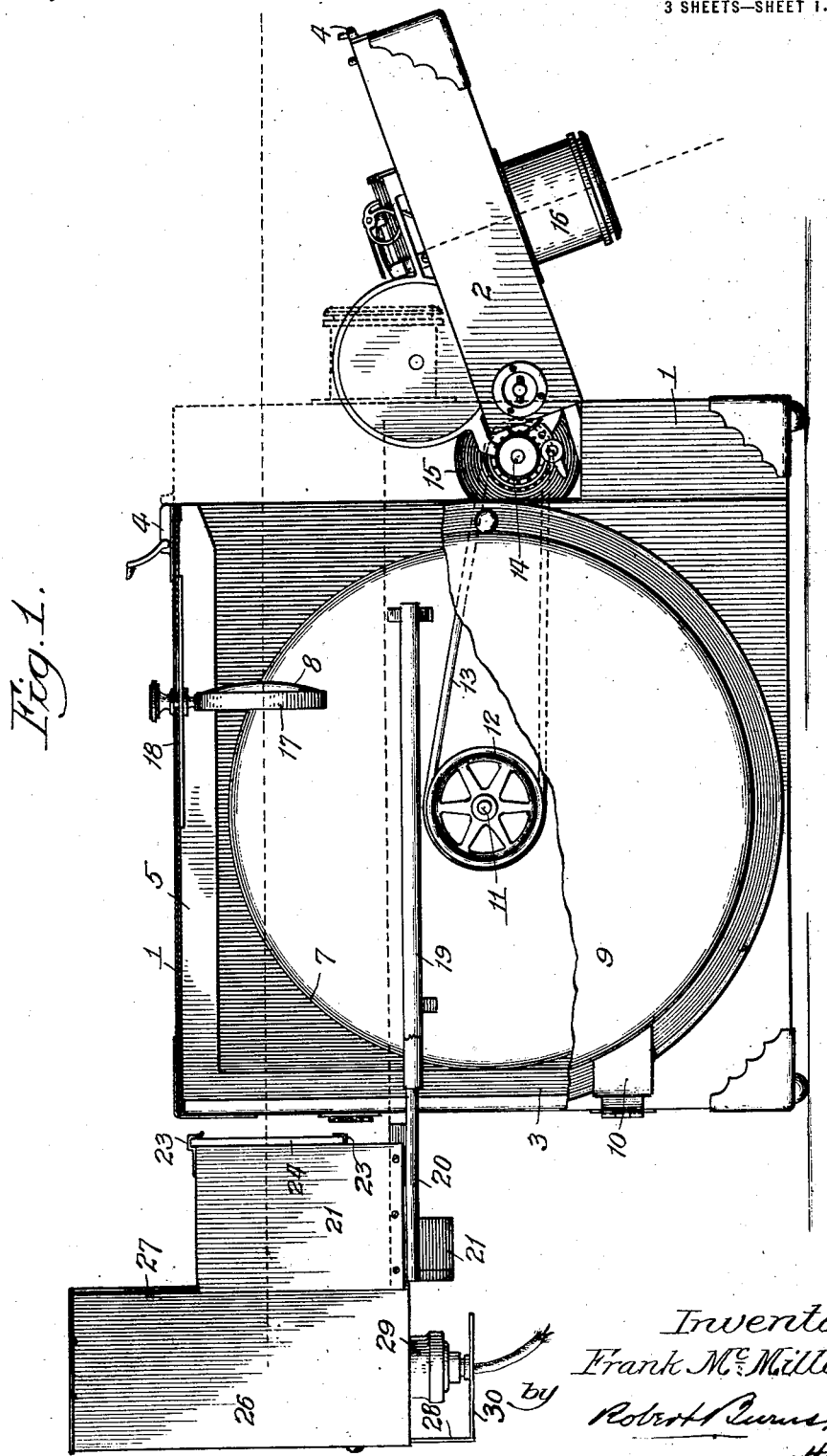

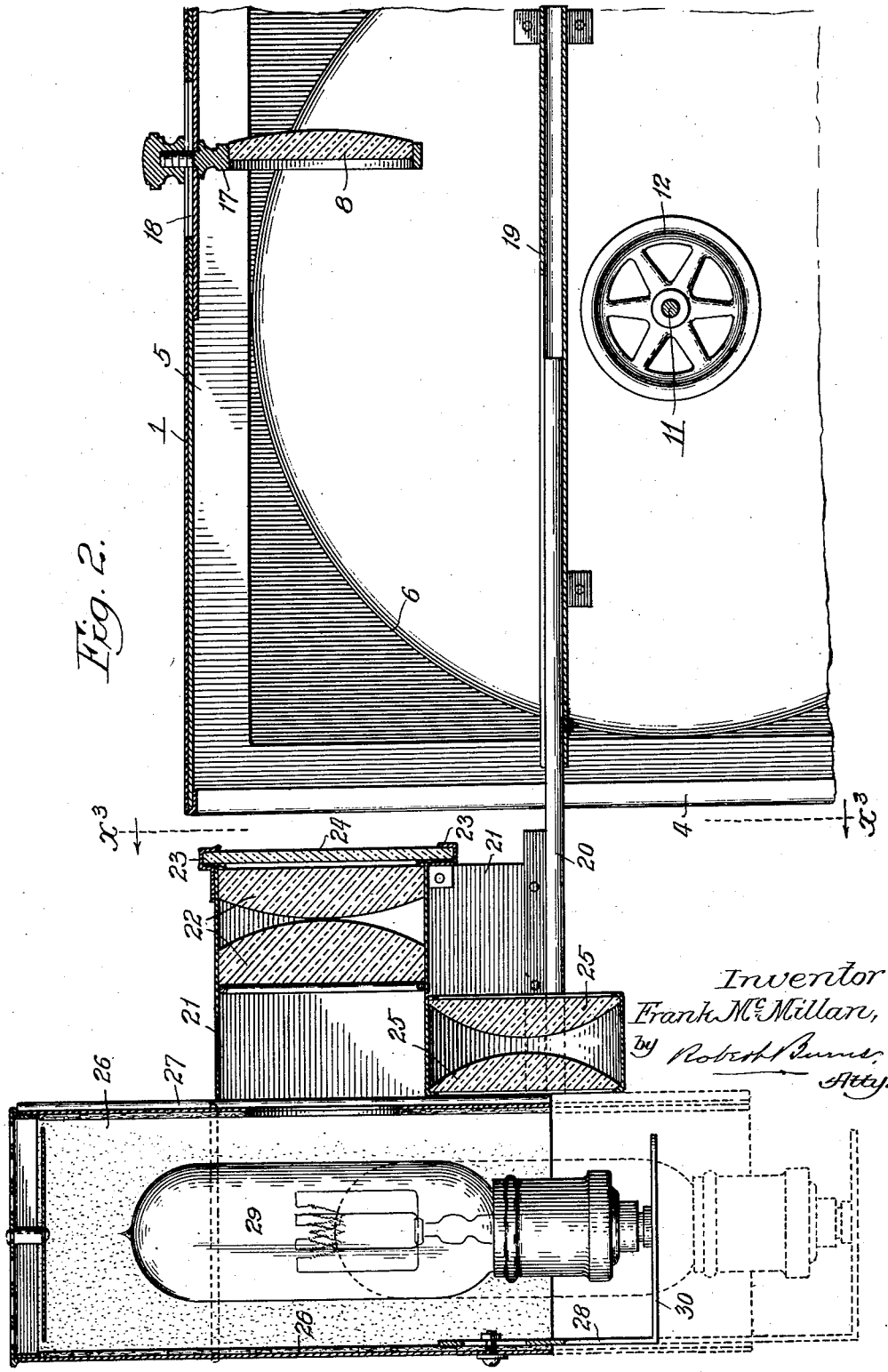

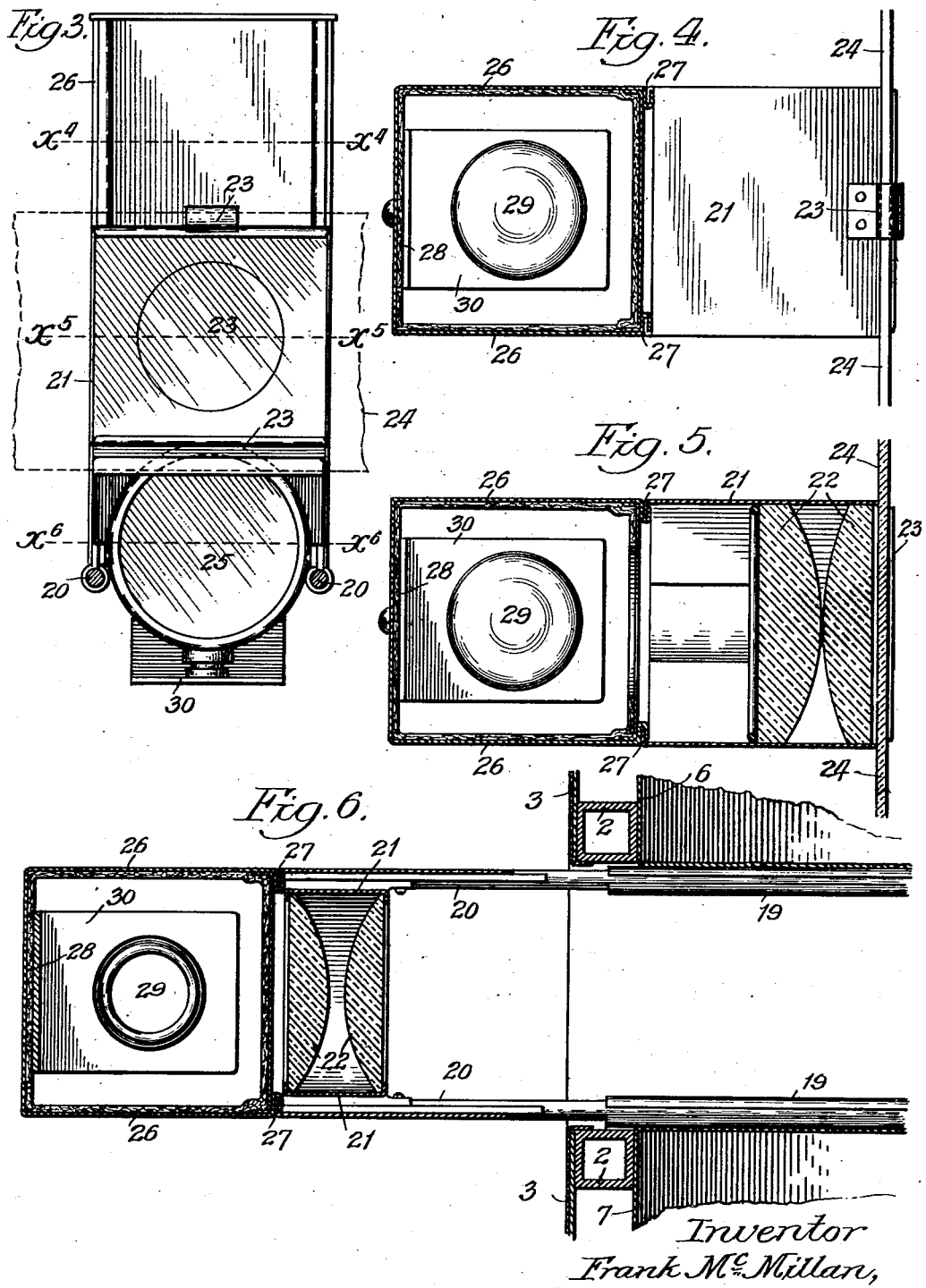

FRANK McMILLAN, OF GLENELLYN, ILLINOIS, ASSIGNOR, BY MESNE ASSIGNMENTS, TO NATIONAL DROP HEAD PROJECTOR COMPANY, OF FOND DU LAC, WISCONSIN, A CORPORATION OF WISCONSIN.

OPTICAL PROJECTING APPARATUS.

1,326,408.      Specification of Letters Patent.     Patented Dec. 30, 1919.

Application filed July 13, 1918, Serial No. 244,708. Renewed May 14, 1919. Serial No. 297,158.

*To all whom it may concern:*

Be it known that I, FRANK McMILLAN, a citizen of the United States of America, and a resident of Glenellyn, in the county of Dupage, State of Illinois, have invented certain new and useful Improvements in Optical Projecting Apparatus, of which the following is a specification.

This invention relates to that type of optical projecting apparatus in which are associated a stereopticon and a motion picture machine arranged with their respective optical centers in approximately parallel relation, and having a single illuminating means capable of adjustment in a plane transverse to said optical centers so as to afford illumination to one or the other of the aforesaid stereopticon or motion picture machine as required. And the present improvement has for its objects:—

To provide a simple and efficient structural formation and association of parts in which a single illuminating means is adapted for adjustment in paths parallel with and transverse to the respective optical centers or light fields of the associated stereopticon and motion picture mechanism, and with which a very effective ventilation is attained, and with which the motion picture mechanism is adapted for removal out of the normal light or illumination path, when a stereopticon exhibition is to be given, and so that in a final folded condition of parts a very compact and readily transportable structure is provided, all as will hereinafter more fully appear.

In the accompanying drawings:—

Figure 1, is a side elevation, with parts broken away and in section, illustrating the general formation and combination of parts in the preferred form of the present invention.

Fig. 2, is an enlarged detail central longitudinal section of the upper rear portion of the main casing and associated lamp house and condenser lenses of the present structure.

Fig. 3, is a transverse sectional elevation, on the line $X^3$—$X^3$, Fig. 2, illustrating the lamp house and condenser lenses of the structure.

Figs. 4, 5 and 6, are detail horizontal sections on lines $X^4$—$X^4$, $X^5$—$X^5$, and $X^6$—$X^6$, Fig. 3, respectively.

Like reference numerals indicate like parts in the several views.

Referring to the drawings, 1 designates the main inclosing casing of the present structure, preferably of the rectangular shell form shown. In the present improvement a portion 2 of the front end or wall of the casing 1 is formed separate from the main body of said casing and is adjustably connected to said main body, preferably in a hinged manner as shown, and constitutes the supporting means for the film feeding mechanism and the associated objective of the motion picture portion of the apparatus, while the rear wall 3 of said casing 1 is formed with an opening or passage adapted to receive the lamp house and condenser lenses, hereinafter described in detail.

4 designates a latch mechanism for holding the hinged portion 2 aforesaid in a closed and operative position.

In its detail construction and arrangement of parts the main casing 1 is similar to the main casing and accessories described and claimed in my companion application for Letters Patent, Serial No. 244,707, and accordingly:—

5 designates portions of a structural iron skeleton supporting frame adapted to afford strength and stability to the inclosing walls of the casing 1, and the parts carried thereby.

6 and 7 designate counterpart reel casings or magazines of a cup form, the inner and closed ends of which are disposed in spaced relation transversely, while their outer open ends are secured by marginal flanges to the respective side walls of the main casing 1. The space between said magazines affords a passage for the light beams from the source of illumination, a containing space for the outer member 8 of the stereopticon lens system of the present structure, and a receiver for the lamp house and the associated casing carrying the condenser lenses of the apparatus hereinafter more fully described.

9 designates one of the doors, which form outer closures for the magazines 6 and 7, pivotally secured to the main casing 1 by hinges 10, as shown in Fig. 1.

11 designates the carrying shaft of the film supply and film take up reels of the machine, the detail construction and arrangement of which are set forth and claimed in a companion application for Letters Patent, Serial No. 244,796.

12 designates a pulley mounted on the central portion of the reel carrying shaft 11 and having endless belt connection 13 with the film feeding mechanism of the machine.

14 designates the primary driving shaft of the film feeding mechanism heretofore referred to, provided with a friction or other suitable driven wheel 15 adapted for operative engagement with a companion drive wheel or pinion on the shaft of an operating motor located in the aforesaid space between the magazine 6 and 7, as set forth in detail in my aforesaid application, Serial No. 244,796.

16 designates the objective of the motion picture mechanism heretofore referred to, and which is mounted in associated relation to the film feeding mechanism on the aforesaid hinged front portion 2 of the main casing 1, and adapted to swing downward along with such portion 2 and with the film feeding mechanism, when the apparatus is adjusted to the position illustrated in Fig. 1, for effecting a stereopticon exhibition. The described arrangement is adapted to provide a close and compact arrangement of the respective optical centers of the stereopticon and motion picture mechanisms.

The lens 8 heretofore referred to as constituting the objective or forward member of the stereopticon lens system of the present apparatus, is arranged centrally in the main casing 1 and made adjustable longitudinally therein, by its holder 17 arranged for sliding movement in a longitudinal slot 18 in the top wall of the main casing, as illustrated more particularly in Fig. 2. In the present construction the optical center of the lens 8 is in a plane a distance above the plane in which the optical center of the motion picture objective 16 aforesaid, is arranged.

19 designates a pair of guideways, preferably of the tubular type shown, and secured in transverse spaced relation and in a longitudinal direction to the inner walls of the pair of magazines 6, 7 above described.

20 designates sliding bars or rods moving in the aforesaid slideways 19, and carrying on their rear ends the inclosing casing 21 of the hereinafter described duplicate optical condenser lenses of the present apparatus. The sliding arrangement just described is adapted to provide for the ordinary focusing adjustment of the aforesaid lenses, and for a movement of the condenser containing casing 21, wholly within the main casing 1, when the apparatus is folded after use, and thus afford a compact arrangement of parts for storage and transportation.

22 designates a pair of condenser lenses of the usual type mounted in the upper portion of the inclosing casing 21 aforesaid with their optical center in line with the optical center of the stereopticon lens or objective 8 above described, individual thereto and in connection therewith comprises the lens system of the stereopticon portion of the present invention.

23 designates transversely arranged guides at the front of the condenser lenses 22 aforesaid, for the movement of a stereopticon slide 24 into and out of the light field of said lenses. 25 designates a companion pair of condenser lenses of the usual type mounted in the lower portion of the casing 21 aforesaid, with their optical center in line with the optical center of the motion picture objective 16, when said objective is shifted to its operative position. The condenser lenses 25 are individual to the objective 16 and in connection therewith comprise the lens system of the motion picture portion of the present apparatus.

26 designates a lamp house or casing preferably of the rectangular form shown and having an open bottom and an orificed or ventilated top of any usual and suitable construction. In the present improvement the lamp house 26 is secured to the rear end of the condenser containing casing 21 aforesaid, by vertically arranged interengaging guide flanges 27, so as to be capable of independent vertical adjustment in relation to the rear end of the casing 21, to bring the lamp or other sources of illumination employed to the respective light paths of the apparatus.

28 designates a lamp carriage having a limited vertical sliding adjustment in the lamp house 26 aforesaid, for the purpose of an initial centering the filament of the lamp 29 in relation to the optical centers of the lens systems of the apparatus, and compensating for differences in the vertical position of the filaments in different lamps.

30 designates a horizontal bottom shelf on the lower end of the lamp carriage 28 for the support of the incandescent electric lamp 29 used as the source of illumination in the present apparatus.

With the means for effecting a vertical adjustment of the lamp house 28 above described, the ready adjustment of the lamp 29 is attained and so that the central point of illumination of the lamp filament will be in line with one or the other of the optical centers of the pairs of condenser lenses 22, 25, and in addition a very compact folding of the parts vertically can be had when it is desired to fold the parts together previous to a horizontal movement of the condenser casing 21 and lamp house 26 into the interior of the casing 1 in preparing the apparatus for storage or transportation.

Having thus fully described my said invention, what I claim as new and desire to secure by Letters Patent, is:—

1. In an optical projection apparatus, the combination of an inclosing housing, stereopticon and motion picture mechanisms arranged in vertically separated relation in said housing, lens systems individual to said mechanisms and arranged in vertically separated relation, a casing carrying the condenser lenses of the systems, and a lamp house carrying a single source of illumination and arranged at the rear of the condenser containing casing in a vertically adjustable manner, substantially as set forth.

2. In an optical projection apparatus, the combination of an inclosing housing, stereopticon and motion picture mechanisms arranged in vertically separated relation in said housing, lens systems individual to said mechanisms and arranged in vertically separated relation, a casing carrying the condenser lenses of the systems connected in a longitudinally adjustable manner to the inclosing housing, and a lamp house carrying a single source of illumination and arranged at the rear of the condenser containing casing in a vertically adjustable manner, substantially as set forth.

3. In an optical projection apparatus, the combination of an inclosing housing carrying a pair of film reel magazines arranged in spaced transverse relation to afford a clear central passage in said housing, stereopticon and motion picture mechanisms arranged in vertically separated relation in said housing, lens systems individual to said mechanisms and arranged in vertically separated relation, a casing carrying the condenser lenses of the systems, and a lamp house carrying a single source of illumination and arranged at the rear of the condenser containing casing in a vertically adjustable manner, substantially as set forth.

4. In an optical projection apparatus, the combination of an inclosing housing carrying a pair of film reel magazines arranged in spaced transverse relation to afford a clear central passage in said housing, stereopticon and motion picture mechanisms arranged in vertically separated relation in said housing, lens systems individual to said mechanisms arranged in vertically separated relation, a casing carrying the condenser lenses of the systems connected in a longitudinally adjustable manner to the inclosing housing, and a lamp house carrying a single source of illumination and arranged at the rear of the condenser containing casing in a vertically adjustable manner, substantially as set forth.

5. In an optical projection apparatus, the combination of an inclosing housing, stereopticon and motion picture mechanisms arranged in vertically separated relation in said housing, an upper front portion movably associated with the said housing and carrying the film feeding mechanism of the motion picture machine, lens systems individual to said mechanisms arranged in vertically separated relation, a casing carrying the condenser lenses of the systems, and a lamp house carrying a single source of illumination and arranged at the rear of the condenser carrying casing in a vertically adjustable manner, substantially as set forth.

6. In an optical projection apparatus, the combination of an inclosing housing, stereopticon and motion picture mechanisms arranged in vertically separated relation in said housing, an upper drop front portion hinged at its lower end to said housing and carrying the film feeding mechanism of the motion picture machine, lens systems individual to said mechanisms arranged in vertically separated relation, a casing carrying the condenser lenses of the systems, and a lamp house carrying a single source of illumination and arranged at the rear of the condenser carrying casing in a vertically adjustable manner, substantially as set forth.

7. In an optical projection apparatus, the combination of an inclosing housing, stereopticon and motion picture mechanisms arranged in vertically separated relation in said housing, an upper front portion movably associated with said housing and carrying the film feeding mechanism of the motion picture machine, lens systems individual to said mechanisms arranged in vertically separated relation, a casing carrying the condenser lenses of the systems, and a lamp house carrying a single source of illumination and arranged at the rear end of the condenser carrying casing in a vertically adjustable manner, substantially as set forth.

8. In an optical projection apparatus, the combination of an inclosing housing, stereopticon and motion picture mechanisms arranged in vertically separated relation in said housing, an upper front portion movably asscociated with the said housing and carrying the film feeding mechanism of the motion picture machine, an upper drop front portion hinged at its lower end to said housing and carrying the film feeding mechanism of the motion picture machine, lens systems individual to said mechanisms arranged in vertically separated relation, a casing carrying the condenser lenses of the systems, and a lamp house carrying a single source of illumination and arranged at the rear of the condenser carrying casing in a vertically adjustable manner, substantially as set forth.

Signed at Santa Cruz, Calif., this 3rd day of June, 1918.

FRANK McMILLAN.